United States Patent
Shi et al.

(10) Patent No.: US 12,330,132 B1
(45) Date of Patent: Jun. 17, 2025

(54) RESIN SUBSTRATE-BASED IRON OXYHYDROXIDE DESULFURIZING AGENT AND PREPARATION METHOD THEREFOR

(71) Applicant: MINGSHUO ENVIRONMENT TECHNOLOGY GROUP CO., LTD., Shandong (CN)

(72) Inventors: Jianming Shi, Shandong (CN); Wenshuo Shi, Shandong (CN)

(73) Assignee: MINGSHUO ENVIRONMENT TECHNOLOGY GROUP CO., LTD., Weifang (CN)

( * ) Notice: Subject to any disclaimer, the term of this patent is extended or adjusted under 35 U.S.C. 154(b) by 0 days.

(21) Appl. No.: 19/004,191

(22) Filed: Dec. 27, 2024

Related U.S. Application Data

(63) Continuation of application No. PCT/CN2024/104906, filed on Jul. 11, 2024.

(30) Foreign Application Priority Data

Nov. 30, 2023 (CN) .......................... 202311617551.8

(51) Int. Cl.
*B01J 20/06* (2006.01)
*B01D 53/52* (2006.01)
*B01D 53/81* (2006.01)
*B01J 20/26* (2006.01)

(52) U.S. Cl.
CPC .............. *B01J 20/06* (2013.01); *B01D 53/52* (2013.01); *B01D 53/81* (2013.01); *B01J 20/262* (2013.01); *B01J 20/265* (2013.01); *B01D 2251/602* (2013.01)

(58) Field of Classification Search
CPC ........ B01J 20/06; B01J 20/262; B01J 20/265; B01D 53/52; B01D 53/81; B01D 2251/602
USPC ........................................................ 423/231
See application file for complete search history.

(56) References Cited

FOREIGN PATENT DOCUMENTS

| | | |
|---|---|---|
| CN | 113842948 A | 12/2021 |
| CN | 115124672 A | 9/2022 |
| CN | 115489183 A | 12/2022 |
| CN | 116212625 A | 6/2023 |
| JP | 2017214639 A | 12/2017 |

*Primary Examiner* — Anita Nassiri-Motlagh

(57) ABSTRACT

Disclosed are a resin substrate-based iron oxyhydroxide desulfurizing agent and a preparation method therefor, falling within the technical field of gas purification and treatment. In the present disclosure, sodium percarbonate is used as a raw material to prepare iron oxyhydroxide. Sodium percarbonate serves both as an alkaline precipitant and as an oxidant. P-aminophenol and formaldehyde are subjected to condensation polymerization to form linear phenolic resin, which is then modified with terephthalyl alcohol to connect into a cross-linked network structure resin. The resin is used as a substrate to obtain the resin substrate-based iron oxyhydroxide desulfurizing agent. The preparation method of the present disclosure is simple and achieves a larger sulfur capacity and desulfurization efficiency, making it suitable for the removal of hydrogen sulfide from waste gas.

7 Claims, 1 Drawing Sheet

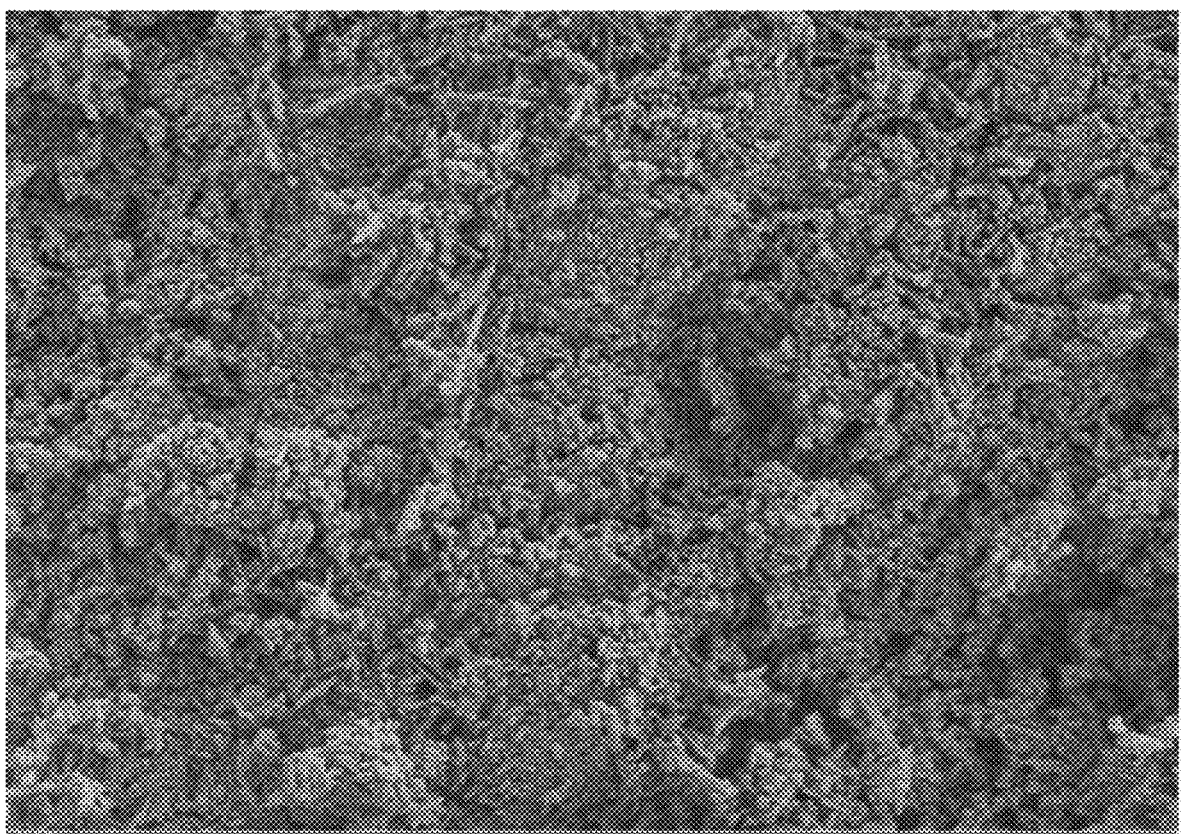

RESIN SUBSTRATE-BASED IRON OXYHYDROXIDE DESULFURIZING AGENT AND PREPARATION METHOD THEREFOR

CROSS-REFERENCE TO RELATED APPLICATIONS

This application is a continuation of PCT/CN2024/104906, filed on Jul. 11, 2024 and claims priority of Chinese Patent Application No. 202311617551.8, filed on Nov. 30, 2023, the entire contents of which are incorporated herein by reference.

TECHNICAL FIELD

The present disclosure belongs to the technical field of gas purification and treatment, and specifically relates to a resin substrate-based iron oxyhydroxide desulfurizing agent and a preparation method therefor.

BACKGROUND

During producing chemical raw materials from coal and petroleum, as well as during oil refining, there is hydrogen sulfide gas, which makes catalysts in subsequent production stages poisoned and deactivated. Large amounts of hydrogen sulfide are also present in many industrial exhaust gases, if directly discharged, they will pollute the environment or make humans and animals poisoned. As the existing primary desulfurizing agent of high sulfur capacity, iron oxyhydroxide desulfurizing agent is widely applied in the removal of sulfur-containing tail gases in fields such as natural gas, oilfield associated gas, coalbed methane, and biogas.

"A process for preparing iron oxyhydroxide with a high specific surface area and co-producing ammonium sulfate" is disclosed in the patent with the publication number of CN106185988A. This method involves that solid ferrous sulfate and solid ammonium carbonate and/or solid ammonium bicarbonate are used as raw materials for reacting, followed by oxidizing a filter cake obtained after the reaction with hydrogen peroxide to produce iron oxyhydroxide with a large specific surface area. This patent details the preparation method for these desulfurizing agents.

"An iron oxyhydroxide fine desulfurizing agent with a high specific surface area and a preparation method therefor" are disclosed in the patent with the publication number of CN108516591A. This method involves that a ferrous salt solution and a precipitant are used as raw materials, while supplementing with hydrogen peroxide and oxygen, followed by band extrusion and drying to produce the desulfurizing agent. In this method, after adding hydrogen peroxide for reaction, air is required to be introduced for oxidation of 2-5 h.

Both methods involve that iron rust is oxidized by adding hydrogen peroxide, or hydrogen peroxide combined with air, followed by filtration, washing, and drying to produce iron oxyhydroxide. The conventional method for producing iron oxyhydroxide is divided into two units: (1) a neutralization unit, where ferrous sulfate reacts with alkaline precipitants such as sodium carbonate or ammonium bicarbonate to generate green rust; and (2) an oxidation unit, where the green rust is converted into iron oxyhydroxide by adding hydrogen peroxide or blowing air. However, the conventional method has the following disadvantages. Firstly, the conventional method is divided into two units, requiring significant equipment investment and a long process flow. Secondly, hydrogen peroxide is employed for oxidation, posing safety risks during transportation of the hydrogen peroxide. Thirdly, if air is used for oxidation, it will require a longer oxidation time, reducing production output.

The adsorption capacity of single iron oxyhydroxide is limited. By contrast, adsorbent resins are porous and highly cross-linked polymer copolymers with a larger specific surface area and pores of various sizes, which can be used for gas adsorption. Therefore, combining the two to develop a new iron oxyhydroxide desulfurizing agent is of great significance.

SUMMARY

To solve the above problem, an objective of the present disclosure is to provide a resin substrate-based iron oxyhydroxide desulfurizing agent and a preparation method therefor.

To realize the above objective, the present disclosure employs the following technical solutions.

A resin substrate-based iron oxyhydroxide desulfurizing agent includes the step of: adding iron oxyhydroxide to a resin substrate, with a mass ratio of the iron oxyhydroxide to resin being 40-80:5-10.

The resin is prepared by condensation polymerization of p-aminophenol and formaldehyde to form a linear phenolic resin, followed by modifying the linear phenolic resin with terephthalyl alcohol to connect into a cross-linked network structure resin.

The iron oxyhydroxide is prepared by the following method:
  (1) preparation of a precipitant solution: adding a precipitant to water, followed by evenly mixing at 35-40° C. to obtain the precipitant solution;
  the precipitant being a mixture of sodium percarbonate and sodium carbonate, with a molar ratio of the sodium percarbonate to the sodium carbonate being 1.1-1.3:1; and
  a concentration of the precipitant solution being 1.5-2.5 mol/L;
  (2) preparation of a ferrous salt solution: adding a solid ferrous salt to water, followed by evenly mixing at 35-40° C. to obtain the ferrous salt solution;
  a molar ratio of the solid ferrous salt to the precipitant in step (1) being 1:1-1.2; and
  a concentration of the ferrous salt solution being 0.5-0.8 mol/L;
  (3) dripping the precipitant solution prepared in step (1) into the ferrous salt solution prepared in step (2) at 35-40° C., and performing aging for 1-3 h after the addition of the precipitant solution is completed to obtain a mixture; and
  (4) filtering the mixture obtained in step (3), and washing an obtained filter cake with water 3-5 times, followed by drying to obtain the iron oxyhydroxide.

The solid ferrous salt in step (2) is one or both of ferrous sulfate heptahydrate and ferrous chloride.

The drying in step (4) is air-drying or drying at 60-90° C.

The resin is prepared by the following method:
  1) by weight, adding 1 part of p-aminophenol, 0.55-0.7 parts of formaldehyde aqueous solution, and 0.01 part of sulfuric acid to a reactor, followed by heating and refluxing for reaction of 1.5 h, adding 2-3 parts of water after the reaction is completed, separating out an aqueous phase, continuing heating to 150° C., applying vacuum to 0.05-0.1 MPa, and reacting for 1-2 h to obtain the phenolic resin; and 2) by weight, adding 0.3-0.5 parts of the phenolic resin obtained in step (1), 1 part of terephthalyl alcohol, 3.8-4.5 parts of triphenylphosphine, and 3-3.5 parts of diisopropyl azodicarboxylate to 10-15 parts of tetrahydrofuran, followed by stirring for dissolving, and heating to 60-80° C. and reacting for 4-8 h, performing reduced-pressure distillation to remove a solvent after the reaction, and washing an obtained solid with ethanol 2-3 times to obtain the resin.

A mass concentration of the formaldehyde aqueous solution in step (1) is 35-40%.

A preparation method for the resin substrate-based iron oxyhydroxide desulfurizing agent includes the following steps: by weight, adding 40-80 parts of iron oxyhydroxide and 5-10 parts of resin to a reactor, adding 150-250 parts of water, heating to 50-60° C., followed by stirring and mixing for 2-3 h, filtering an obtained mixed solution after the stirring, and drying the obtained filter cake at 90° C. for 3-5 h to obtain the resin substrate-based iron oxyhydroxide desulfurizing agent.

The present disclosure has the following advantages over the prior art.

The resin substrate-based iron oxyhydroxide desulfurizing agent of the present disclosure involves that sodium percarbonate is used as a raw material for preparing iron oxyhydroxide. Sodium percarbonate serves both as an alkaline precipitant and as an oxidant, allowing the two process units in the prior art to be combined into one unit, reducing equipment investment and requiring less space. Additionally, the solid sodium percarbonate is safer than hydrogen peroxide. Furthermore, as an oxidant, the oxidation rate of sodium percarbonate is faster than that of air, significantly increasing production output.

The resin substrate-based iron oxyhydroxide desulfurizing agent of the present disclosure is prepared by condensation polymerization of p-aminophenol and formaldehyde to form a linear phenolic resin, followed by modifying the linear phenolic resin with terephthalyl alcohol to connect into a cross-linked network structure resin. The resin prepared in the present disclosure is porous and can be used for the adsorption of hydrogen sulfide gas. Additionally, the resin contains amino and hydroxyl groups that can react with hydrogen sulfide gas, increasing the active sites for hydrogen sulfide capture, thereby enhancing the sulfur capacity and desulfurization efficiency of the resin substrate-based iron oxyhydroxide desulfurizing agent.

The resin substrate-based iron oxyhydroxide desulfurizing agent of the present disclosure is simple in preparation, and achieves high sulfur capacity and desulfurization efficiency, making it suitable for the removal of hydrogen sulfide from waste gases.

BRIEF DESCRIPTION OF THE DRAWINGS

FIG. 1 is an image of a resin substrate-based iron oxyhydroxide desulfurizing agent prepared in Example 3 of the present disclosure under a scanning electron microscope.

DETAILED DESCRIPTION

To better understand the technical solution of the present disclosure, the detailed description of the above content of the present disclosure is provided below through the specific embodiments in the form of examples. However, the scope of the above-mentioned subject of the present disclosure is not limited thereto. Any technology implemented based on the above content of the present disclosure falls within the scope of the present disclosure.

Example 1

The preparation of iron oxyhydroxide:
(1) 0.25 kg of sodium percarbonate and 0.075 kg of sodium carbonate were added to 1 L of water, followed by evenly mixing at 35° C. to obtain a precipitant solution.
(2) 0.42 kg of ferrous sulfate heptahydrate was added to 3 L of water, followed by evenly mixing at 35° C. to obtain a ferrous salt solution.
(3) At 35° C., the precipitant solution was dripped into the ferrous salt solution. After the addition of the precipitant solution was completed, aging was performed for 1 h to obtain a mixture.
(4) The obtained mixture was filtered, and an obtained filter cake was washed with water 3 times, followed by air-drying to obtain the iron oxyhydroxide.

The preparation of resin:
1) 1 kg of p-aminophenol, 0.55 kg of formaldehyde aqueous solution with a mass concentration of 40%, and 0.01 kg of sulfuric acid were added into a reactor, followed by heating and refluxing for reaction of 1.5 h. After the reaction was completed, 2 kg of water was added and an aqueous phase was separated out. Heating was continuously performed to 150° C. Vacuum was applied to 0.05 Mpa, followed by reacting for 1 h to obtain phenolic resin.
2) 0.3 kg of phenolic resin, 1 kg of terephthalyl alcohol, 3.8 kg of triphenylphosphine, and 3 kg of diisopropyl azodicarboxylate were added into 10 kg of tetrahydrofuran, followed by stirring for dissolving. Heating was performed to 60° C. for reaction of 4 h. After the reaction was completed, reduced-pressure distillation was performed to remove a solvent. An obtained solid was washed with ethanol twice to obtain the resin.

The preparation of resin substrate-based iron oxyhydroxide desulfurizing agent:
4 kg of iron oxyhydroxide and 0.5 kg of resin were added into a reactor, and then 15 kg of water was added, followed by heating to 50° C. and stirring for 2 h. After the stirring was completed, an obtained mixed solution was filtered. An obtained filter cake was dried at 90° C. for 3 h to obtain the resin substrate-based iron oxyhydroxide desulfurizing agent.

Example 2

The preparation of iron oxyhydroxide:
(1) 0.3 kg of sodium percarbonate and 0.091 kg of sodium carbonate were added to 1 L of water, followed by evenly mixing at 36° C. to obtain a precipitant solution.
(2) 0.48 kg of ferrous sulfate heptahydrate was added to 3.1 L of water, followed by evenly mixing at 36° C. to obtain a ferrous salt solution.
(3) At 35° C., the precipitant solution was dripped into the ferrous salt solution. After the addition of the precipitant solution was completed, aging was performed for 1.5 h to obtain a mixture.
(4) The obtained mixture was filtered, and an obtained filter cake was washed with water 4 times, followed by drying at 60° C. to obtain the iron oxyhydroxide.

The preparation of resin:
1) 1 kg of p-aminophenol, 0.6 kg of formaldehyde aqueous solution with a mass concentration of 38%, and 0.01 kg of sulfuric acid were added into a reactor, followed by heating and refluxing for reaction of 1.5 h. After the reaction was completed, 2.2 kg of water was added and an aqueous phase was separated out. Heating was continuously performed to 150° C. Vacuum was applied to 0.06 Mpa, followed by reacting for 1.2 h to obtain phenolic resin.

2) 0.35 kg of phenolic resin, 1 kg of terephthalyl alcohol, 4 kg of triphenylphosphine, and 3.1 kg of diisopropyl azodicarboxylate were added into 11 kg of tetrahydrofuran, followed by stirring for dissolving. Heating was performed to 65° C. for reaction of 5 h. After the reaction was completed, reduced-pressure distillation was performed to remove a solvent. An obtained solid was washed with ethanol twice to obtain the resin.

The preparation of resin substrate-based iron oxyhydroxide desulfurizing agent:

5 kg of iron oxyhydroxide and 0.6 kg of resin were added into a reactor, and then 18 kg of water was added, followed by heating to 55° C. and stirring for 2.2 h. After the stirring was completed, an obtained mixed solution was filtered. An obtained filter cake was dried at 90° C. for 3.5 h to obtain the resin substrate-based iron oxyhydroxide desulfurizing agent.

Example 3

The preparation of iron oxyhydroxide:
(1) 0.34 kg of sodium percarbonate and 0.095 kg of sodium carbonate were added to 1 L of water, followed by evenly mixing at 38° C. to obtain a precipitant solution.
(2) 0.23 kg of ferrous chloride was added to 3 L of water, followed by evenly mixing at 38° C. to obtain a ferrous salt solution.
(3) At 37° C., the precipitant solution was dripped into the ferrous salt solution. After the addition of the precipitant solution was completed, aging was performed for 2 h to obtain a mixture.
(4) The obtained mixture was filtered, and an obtained filter cake was washed with water 4 times, followed by drying at 70° C. to obtain the iron oxyhydroxide.

The preparation of resin:
1) 1 kg of p-aminophenol, 0.65 kg of formaldehyde aqueous solution with a mass concentration of 36%, and 0.01 kg of sulfuric acid were added into a reactor, followed by heating and refluxing for reaction of 1.5 h. After the reaction was completed, 2.5 kg of water was added and an aqueous phase was separated out. Heating was continuously performed to 150° C. Vacuum was applied to 0.07 Mpa, followed by reacting for 1.5 h to obtain phenolic resin.
2) 0.38 kg of phenolic resin, 1 kg of terephthalyl alcohol, 4.2 kg of triphenylphosphine, and 3.3 kg of diisopropyl azodicarboxylate were added into 13 kg of tetrahydrofuran, followed by stirring for dissolving. Heating was performed to 70° C. for reaction of 5.5 h. After the reaction was completed, reduced-pressure distillation was performed to remove a solvent. An obtained solid was washed with ethanol 3 times to obtain the resin.

The preparation of resin substrate-based iron oxyhydroxide desulfurizing agent:

6 kg of iron oxyhydroxide and 0.75 kg of resin were added into a reactor, and then 20 kg of water was added, followed by heating to 55° C. and stirring for 2.5 h. After the stirring was completed, an obtained mixed solution was filtered. An obtained filter cake was dried at 90° C. for 4 h to obtain the resin substrate-based iron oxyhydroxide desulfurizing agent. The image obtained by a scanning electron microscope is shown in FIG. 1.

Example 4

The preparation of iron oxyhydroxide:
(1) 0.38 kg of sodium percarbonate and 0.11 kg of sodium carbonate were added to 1 L of water, followed by evenly mixing at 36° C. to obtain a precipitant solution.
(2) 0.24 kg of ferrous chloride was added to 2.7 L of water, followed by evenly mixing at 38° C. to obtain a ferrous salt solution.
(3) At 37° C., the precipitant solution was dripped into the ferrous salt solution. After the addition of the precipitant solution was completed, aging was performed for 2.5 h to obtain a mixture.
(4) The obtained mixture was filtered, and an obtained filter cake was washed with water 4 times, followed by drying at 80° C. to obtain the iron oxyhydroxide.

The preparation of resin:
1) 1 kg of p-aminophenol, 0.68 kg of formaldehyde aqueous solution with a mass concentration of 36%, and 0.01 kg of sulfuric acid were added into a reactor, followed by heating and refluxing for reaction of 1.5 h. After the reaction was completed, 2.8 kg of water was added and an aqueous phase was separated out. Heating was continuously performed to 150° C. Vacuum was applied to 0.08 Mpa, followed by reacting for 1.8 h to obtain phenolic resin.
2) 0.45 kg of phenolic resin, 1 kg of terephthalyl alcohol, 4.4 kg of triphenylphosphine, and 3.3 kg of diisopropyl azodicarboxylate were added into 14 kg of tetrahydrofuran, followed by stirring for dissolving. Heating was performed to 75° C. for reaction of 6 h. After the reaction was completed, reduced-pressure distillation was performed to remove a solvent. An obtained solid was washed with ethanol 3 times to obtain the resin.

The preparation of resin substrate-based iron oxyhydroxide desulfurizing agent:

7 kg of iron oxyhydroxide and 0.8 kg of resin were added into a reactor, and then 22 kg of water was added, followed by heating to 58° C. and stirring for 2.8 h. After the stirring was completed, an obtained mixed solution was filtered. An obtained filter cake was dried at 90° C. for 4.5 h to obtain the resin substrate-based iron oxyhydroxide desulfurizing agent.

Example 5

The preparation of iron oxyhydroxide:
(1) 0.44 kg of sodium percarbonate and 0.12 kg of sodium carbonate were added to 1 L of water, followed by evenly mixing at 40° C. to obtain a precipitant solution.
(2) 0.58 kg of ferrous sulfate heptahydrate was added to 2.6 L of water, followed by evenly mixing at 40° C. to obtain a ferrous salt solution.
(3) At 40° C., the precipitant solution was dripped into the ferrous salt solution. After the addition of the precipitant solution was completed, aging was performed for 3 h to obtain a mixture.
(4) The obtained mixture was filtered, and an obtained filter cake was washed with water 5 times, followed by drying at 90° C. to obtain the iron oxyhydroxide.

The preparation of resin:
1) 1 kg of p-aminophenol, 0.7 kg of formaldehyde aqueous solution with a mass concentration of 35%, and 0.01 kg of sulfuric acid were added into a reactor, followed by heating and refluxing for reaction of 1.5 h. After the reaction was completed, 3 kg of water was added and an aqueous phase was separated out. Heating was continuously performed to 150° C. Vacuum was applied to 0.1 Mpa, followed by reacting for 2 h to obtain phenolic resin.

2) 0.5 kg of phenolic resin, 1 kg of terephthalyl alcohol, 4.5 kg of triphenylphosphine, and 3.5 kg of diisopropyl azodicarboxylate were added into 15 kg of tetrahydrofuran, followed by stirring for dissolving. Heating was performed to 80° C. for reaction of 8 h. After the reaction was completed, reduced-pressure distillation was performed to remove a solvent. An obtained solid was washed with ethanol 3 times to obtain the resin.

The preparation of resin substrate-based iron oxyhydroxide desulfurizing agent:

8 kg of iron oxyhydroxide and 1 kg of resin were added into a reactor, and then 25 kg of water was added, followed by heating to 60° C. and stirring for 3 h. After the stirring was completed, an obtained mixed solution was filtered. An obtained filter cake was dried at 90° C. for 5 h to obtain the resin substrate-based iron oxyhydroxide desulfurizing agent.

Example 6

The preparation of iron oxyhydroxide:
(1) 0.41 kg of sodium percarbonate and 0.12 kg of sodium carbonate were added to 1 L of water, followed by evenly mixing at 35° C. to obtain a precipitant solution.
(2) 0.7 kg of ferrous sulfate heptahydrate was added to 3.1 L of water, followed by evenly mixing at 40° C. to obtain a ferrous salt solution.
(3) At 40° C., the precipitant solution was dripped into the ferrous salt solution. After the addition of the precipitant solution was completed, aging was performed for 1 h to obtain a mixture.
(4) The obtained mixture was filtered, and an obtained filter cake was washed with water 3 times, followed by air-drying to obtain the iron oxyhydroxide.

The preparation of resin:
1) 1 kg of p-aminophenol, 0.55 kg of formaldehyde aqueous solution with a mass concentration of 35%, and 0.01 kg of sulfuric acid were added into a reactor, followed by heating and refluxing for reaction of 1.5 h. After the reaction was completed, 3 kg of water was added and an aqueous phase was separated out. Heating was continuously performed to 150° C. Vacuum was applied to 0.09 Mpa, followed by reacting for 1 h to obtain phenolic resin.

2) 0.4 kg of phenolic resin, 1 kg of terephthalyl alcohol, 3.8 kg of triphenylphosphine, and 3.5 kg of diisopropyl azodicarboxylate were added into 15 kg of tetrahydrofuran, followed by stirring for dissolving. Heating was performed to 80° C. for reaction of 4 h. After the reaction was completed, reduced-pressure distillation was performed to remove a solvent. An obtained solid was washed with ethanol 3 times to obtain the resin.

The preparation of resin substrate-based iron oxyhydroxide desulfurizing agent:

4 kg of iron oxyhydroxide and 1 kg of resin were added into a reactor, and then 20 kg of water was added, followed by heating to 50° C. and stirring for 3 h. After the stirring was completed, an obtained mixed solution was filtered. An obtained filter cake was dried at 90° C. for 3.5 h to obtain the resin substrate-based iron oxyhydroxide desulfurizing agent.

The iron oxyhydroxide prepared in Example 3 was used as a comparative example. The performance indicators of the resin substrate-based iron oxyhydroxide desulfurizing agents prepared in Examples 1 to 6 and the iron oxyhydroxide of the comparative example were tested, respectively. The sulfur capacity was tested according to the method specified in HG/T 5759-2020 iron oxide desulfurizing agent at room temperature. The results are shown in Table 1.

TABLE 1

| the performance indicators of products in examples and comparative example | | | | | | | |
|---|---|---|---|---|---|---|---|
| Example | 1 | 2 | 3 | 4 | 5 | 6 | Comparative Example |
| Specific surface area (m²/g) | 151 | 123 | 102 | 106 | 137 | 145 | 174 |
| Sulfur capacity (%) | 41 | 45 | 49 | 48 | 43 | 41 | 31 |

It can be seen from the results in Table 1 that, due to the porosity of the resin and the adsorption to hydrogen sulfide, the resin substrate-based iron oxyhydroxide desulfurizing agent prepared in the present disclosure has a larger sulfur capacity than a single iron oxyhydroxide desulfurizing agent.

To verify the desulfurization efficiency of the resin substrate-based iron oxyhydroxide desulfurizing agent prepared in the present disclosure, the desulfurization efficiency of the resin substrate-based iron oxyhydroxide desulfurizing agents prepared in Examples 1 to 6 and the iron oxyhydroxide prepared in the comparative example were tested in a micro fixed-bed reactor. The reactor had dimensions of Φ 10 mm*12 mm*300 mm, with a loading capacity of 0.5 g of desulfurizing agent, and was packed with quartz sand at the top and bottom ends. A mixed gas of hydrogen sulfide and nitrogen gas was used as a simulated raw gas, with a hydrogen sulfide content of 20 mg/L. The hydrogen sulfide not removed by the desulfurizing agent was absorbed by a tail gas absorption solution, and the hydrogen sulfide in the absorption solution was detected using the iodine method every 5 min. When the concentration of the purified gas reached 10% of the concentration of hydrogen sulfide gas in the simulated raw gas, it was considered that the desulfurizing agent was fully penetrated, and the experiment was stopped, with the penetration time recorded. The desulfurization efficiency was calculated according to the content of sulfur adsorbed by the absorption solution, using the following formula:

$$\eta = \frac{V \times W_{H_2S} - (C_1 V_1 - 0.5 C_2 V_2) \times 34}{V \times W_{H_2S}} \times 100\%$$

where $\eta$ represents the desulfurization efficiency of the desulfurizing agent (%), V represents the total gas volume (L), $W_{H_2S}$ represents the hydrogen sulfide content in the sample gas (mg/L), $C_1$ represents the concentration of the $I_2$ standard solution (mol/L), $V_1$ represents the volume of the $I_2$ standard solution added (mL), $C_2$ represents the concentration of the $Na_2S_2O_3$ standard solution (mol/L), $V_2$ represents the volume of the $Na_2S_2O_3$ standard solution consumed during titration (mL), and 34 is the molar mass of hydrogen sulfide (g/mol). The test results of the desulfurization efficiency and penetration time are shown in Table 2.

TABLE 2 the desulfurization efficiency of products
in examples and comparative example (η)

| Example | 1 | 2 | 3 | 4 | 5 | 6 | Comparative Example |
|---|---|---|---|---|---|---|---|
| η (%) | 98.5 | 99.3 | 99.8 | 99.6 | 99.0 | 98.8 | 93.0 |
| Penetration time (min) | 37 | 42 | 47 | 44 | 40 | 39 | 25 |

It can be seen from the results in Table 2 that, due to the capture of hydrogen sulfide by hydroxyl and amino groups in the resin, the resin substrate-based iron oxyhydroxide desulfurizing agent prepared in the present disclosure has a higher desulfurization efficiency. Furthermore, the higher the sulfur capacity, the longer the penetration time and the higher the desulfurization efficiency.

Although the specific embodiment of the present disclosure has been described, the scope of protection of the present disclosure is not limited thereto. On the basis of the technical solutions of the present disclosure, various modifications or deformations made by those of skill in the art are still within the scope of protection of the present disclosure.

The invention claimed is:

1. A resin substrate-based iron oxyhydroxide desulfurizing agent, prepared by adding iron oxyhydroxide to a resin substrate, with a mass ratio of the iron oxyhydroxide to resin being 40-80:5-10, wherein
the resin is prepared by condensation polymerization of p-aminophenol and formaldehyde to form a linear phenolic resin, followed by modifying the linear phenolic resin with terephthalyl alcohol.

2. The resin substrate-based iron oxyhydroxide desulfurizing agent according to claim 1, wherein the iron oxyhydroxide is prepared by the following method:
(1) preparation of a precipitant solution: adding a precipitant to water, followed by evenly mixing at 35-40° C. to obtain the precipitant solution;
the precipitant being a mixture of sodium percarbonate and sodium carbonate, with a molar ratio of the sodium percarbonate to the sodium carbonate being 1.1-1.3:1; and
a concentration of the precipitant solution being 1.5-2.5 mol/L;
(2) preparation of a ferrous salt solution: adding a solid ferrous salt to water, followed by evenly mixing at 35-40° C. to obtain the ferrous salt solution;
a molar ratio of the solid ferrous salt to the precipitant in step (1) being 1:1-1.2; and
a concentration of the ferrous salt solution being 0.5-0.8 mol/L;
(3) dripping the precipitant solution prepared in step (1) into the ferrous salt solution prepared in step (2) at 35-40° C., and performing aging for 1-3 h after the addition of the precipitant solution is completed to obtain a mixture; and
(4) filtering the mixture obtained in step (3), and washing an obtained filter cake with water 3-5 times, followed by drying to obtain the iron oxyhydroxide.

3. The resin substrate-based iron oxyhydroxide desulfurizing agent according to claim 2, wherein the solid ferrous salt in step (2) is one or both of ferrous sulfate heptahydrate and ferrous chloride.

4. The resin substrate-based iron oxyhydroxide desulfurizing agent according to claim 2, wherein the drying in step (4) is air-drying or drying at 60-90° C.

5. The resin substrate-based iron oxyhydroxide desulfurizing agent according to claim 1, wherein the resin is prepared by the following method:
1) By weight, adding 1 part of p-aminophenol, 0.55-0.7 parts of formaldehyde aqueous solution, and 0.01 part of sulfuric acid to a reactor, followed by heating and refluxing for reaction of 1.5 h, adding 2-3 parts of water after the reaction is completed, separating out an aqueous phase, continuing heating to 150° C., applying vacuum to 0.05-0.1 MPa, and reacting for 1-2 h to obtain the phenolic resin; and
2) By weight, adding 0.3-0.5 parts of the phenolic resin obtained in step (1), 1 part of terephthalyl alcohol, 3.8-4.5 parts of triphenylphosphine, and 3-3.5 parts of diisopropyl azodicarboxylate to 10-15 parts of tetrahydrofuran, followed by stirring for dissolving, and heating to 60-80° C. and reacting for 4-8 h, performing reduced-pressure distillation to remove a solvent after the reaction, and washing an obtained solid with ethanol 2-3 times to obtain the resin.

6. The resin substrate-based iron oxyhydroxide desulfurizing agent according to claim 5, wherein a mass concentration of the formaldehyde aqueous solution in step (1) is 35-40%.

7. A preparation method for the resin substrate-based iron oxyhydroxide desulfurizing agent according to claim 1, comprising the following steps:
by weight, adding 40-80 parts of iron oxyhydroxide and 5-10 parts of resin to a reactor, adding 150-250 parts of water, heating to 50-60° C., followed by stirring and mixing for 2-3 h, filtering an obtained mixed solution after the stirring, and drying the obtained filter cake at 90° C. for 3-5 h to obtain the resin substrate-based iron oxyhydroxide desulfurizing agent.

* * * * *